United States Patent
Garcia Briz et al.

(10) Patent No.: US 9,847,678 B2
(45) Date of Patent: Dec. 19, 2017

(54) METHODS AND SYSTEMS FOR COMPATIBLE OPERATION BETWEEN A WIRELESS POWER TRANSFER SYSTEM AND WIRELESSLY COMMUNICATING VEHICLE SYSTEMS

(71) Applicant: QUALCOMM Incorporated, San Diego, CA (US)

(72) Inventors: Alberto Garcia Briz, Munich (DE); Joshua Reuben Lee, Munich (DE)

(73) Assignee: QUALCOMM INCORPORATED, San Diego, CA (US)

( * ) Notice: Subject to any disclaimer, the term of this patent is extended or adjusted under 35 U.S.C. 154(b) by 174 days.

(21) Appl. No.: 14/858,273

(22) Filed: Sep. 18, 2015

(65) Prior Publication Data
US 2017/0085128 A1    Mar. 23, 2017

(51) Int. Cl.
*H02J 7/00* (2006.01)
*H02J 50/10* (2016.01)
(Continued)

(52) U.S. Cl.
CPC ............. *H02J 50/10* (2016.02); *B60L 11/182* (2013.01); *B60L 11/1838* (2013.01);
(Continued)

(58) Field of Classification Search
CPC ... B60L 11/182; H04B 5/0037; H04B 5/0031; H04B 5/0075; H02J 5/005; H02J 7/025;
(Continued)

(56) References Cited

U.S. PATENT DOCUMENTS

| 7,433,647 B2 | 10/2008 | Lemense et al. |
| 2008/0106375 A1* | 5/2008 | Nakajima ............. B60R 25/245 340/5.72 |

(Continued)

FOREIGN PATENT DOCUMENTS

EP    2521277 A2    11/2012

OTHER PUBLICATIONS

International Search Report and Written Opinion—PCT/US2016/050209—ISA/EPO—dated Dec. 12, 2016.

*Primary Examiner* — Vuthe Siek
(74) *Attorney, Agent, or Firm* — Knobbe, Martens, Olson & Bear, LLP

(57) ABSTRACT

Methods and apparatuses for wireless communication with a system of a vehicle are provided. One implementation includes an apparatus for wireless communication with a system of a vehicle. The apparatus comprises a first antenna configured to receive a signal from the system of the vehicle. The apparatus comprises a processor configured to determine whether the first antenna is saturated by an external magnetic field. The processor is further configured to cause the at least one of the first antenna or a second antenna to transmit a frame indicating that the first antenna is saturated by the external magnetic field in response to determining that the first antenna is saturated. The frame is a periodic frame. The processor is further configured to transmit an identification frame identifying the apparatus in response to receiving a trigger signal. A wireless power transmitter is configured to reduce or discontinue wireless power transmission in response to receiving the frame.

30 Claims, 8 Drawing Sheets

(51) Int. Cl.
*H04W 84/00* (2009.01)
*B60L 11/18* (2006.01)
*H04B 5/00* (2006.01)

(52) U.S. Cl.
CPC ......... *H04B 5/0037* (2013.01); *H04B 5/0075* (2013.01); *H04W 84/005* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01)

(58) Field of Classification Search
CPC . H02J 7/04; H02J 50/10; Y02T 90/169; Y04S 30/14; H04W 84/005
See application file for complete search history.

(56) References Cited

U.S. PATENT DOCUMENTS

| | | | |
|---|---|---|---|
| 2011/0115605 A1* | 5/2011 | Dimig | B60L 1/00 340/5.61 |
| 2012/0153894 A1 | 6/2012 | Widmer | |
| 2012/0296567 A1 | 11/2012 | Breed | |
| 2014/0247112 A1 | 9/2014 | Bassali | |
| 2015/0022332 A1 | 1/2015 | Lin | |
| 2015/0042167 A1* | 2/2015 | Kim | H02J 17/00 307/104 |
| 2015/0171659 A1 | 6/2015 | Lee | |

* cited by examiner

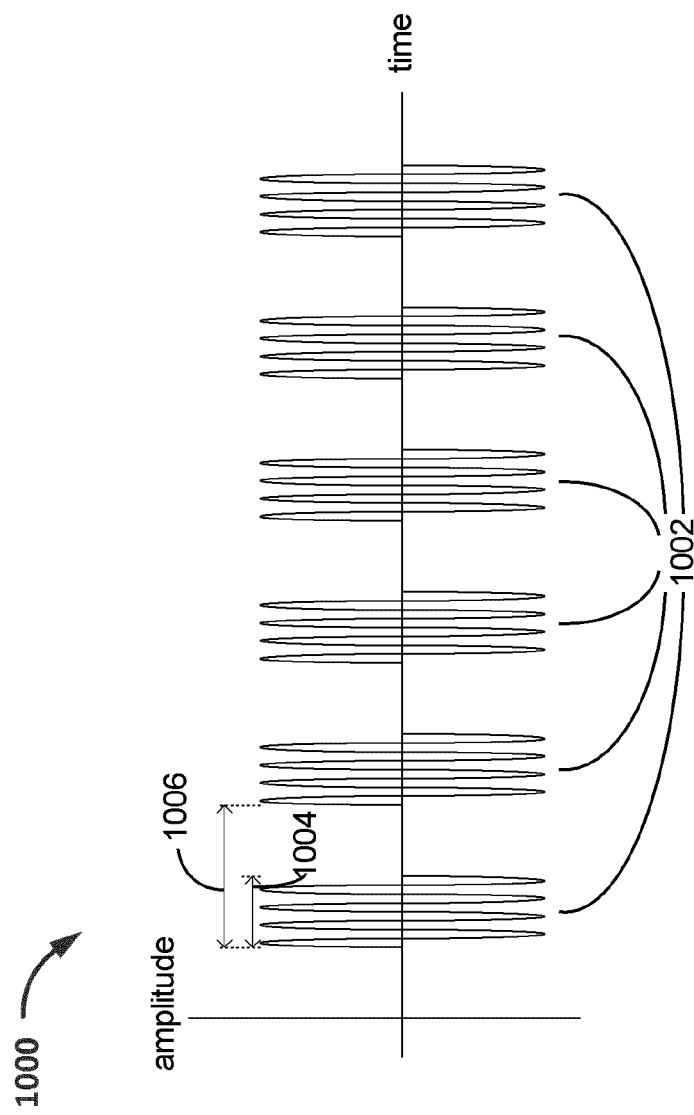

METHODS AND SYSTEMS FOR COMPATIBLE OPERATION BETWEEN A WIRELESS POWER TRANSFER SYSTEM AND WIRELESSLY COMMUNICATING VEHICLE SYSTEMS

FIELD

This disclosure generally relates to wireless power transfer. More specifically, the disclosure is directed to devices, systems, and methods related to providing compatible operation between wireless power transfer systems and wirelessly communicating vehicle systems.

BACKGROUND

Wirelessly communicating vehicle systems including remote keyless entry systems provide convenient functionality to users of vehicles, including hands-free locking and unlocking of doors, theft protection, keyless ignition, and real-time monitoring of particular vehicle systems, such as tire pressure monitoring systems. Such systems rely at least in part on receiving and processing a signal from a handheld key fob, another compatible device, or other sensor in proximity to the enabled vehicle. When active in proximity to enabled vehicles, wireless power transfer systems may produce powerful wireless fields that can affect performance of (e.g., saturate) receive antennas in the vehicle remote keyless entry system, the handheld key fob, another compatible device, and/or other vehicle systems that communicate wirelessly. This may compromise the ability of these systems or the hand held key fob or other compatible device to receive and process the signals required for proper operation. Thus, there is a need to control the operation of such wireless power transfer systems during periods of such systems' use.

SUMMARY

An apparatus for wireless communication with a system of a vehicle is provided. The apparatus comprises a first antenna configured to receive a signal from the system of the vehicle. The apparatus comprises a processor configured to determine whether the first antenna is saturated by an external magnetic field. The processor is further configured to cause at least one of the first antenna or a second antenna to transmit a frame indicating that the first antenna is saturated by the external magnetic field in response to determining that the first antenna is saturated.

A method for wireless communication with a system of a vehicle is provided. The method comprises determining whether a first antenna is saturated by an external magnetic field. The method comprises transmitting a frame indicating that the first antenna is saturated by the external magnetic field in response to determining that the first antenna is saturated.

A non-transitory computer-readable medium comprising code is provided. The code, when executed, causes an apparatus for wireless communication with a system of a vehicle to determine whether a first antenna of the apparatus is saturated by an external magnetic field. The code, when executed, causes the apparatus to transmit a frame indicating that the first antenna is saturated by the external magnetic field in response to determining that the first antenna is saturated.

An apparatus for wireless communication with a system of a vehicle is provided. The apparatus comprises means for receiving a signal from the system of the vehicle. The apparatus comprises means for determining whether the means for receiving the signal is saturated by an external magnetic field. The apparatus comprises means for transmitting a frame indicating that the means for receiving the signal is saturated by the external magnetic field in response to determining that the means for receiving the signal is saturated.

BRIEF DESCRIPTION OF THE DRAWINGS

FIG. 10 is a graphic diagram illustrating the high frequency periodic signal described with respect to FIG. 9, in accordance with some implementations.

Figure 1:
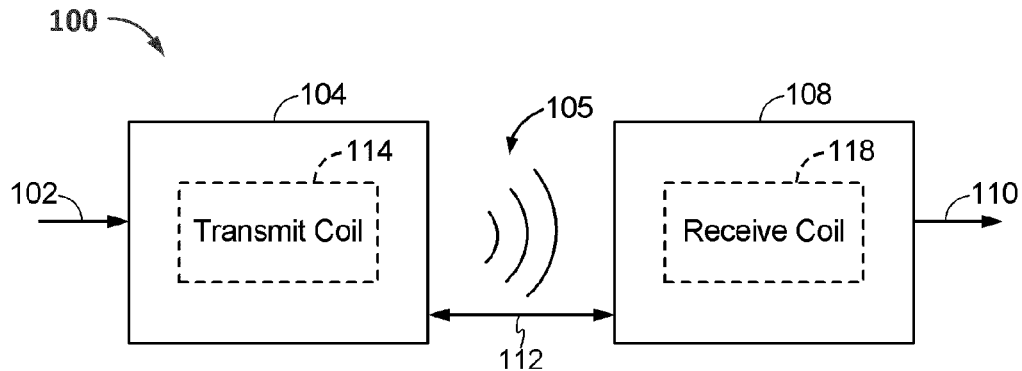
FIG. 1 is a functional block diagram of a wireless power transfer system, in accordance with some implementations.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the application and is not intended to represent the only implementations that may be practiced. The term "exemplary" used throughout this description means "serving as an example, instance, or illustration," and should not necessarily be construed as preferred or advantageous over other implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coil" to achieve power transfer.

FIG. 1 is a functional block diagram of a wireless power transfer system 100, in accordance with some implementations. An input power 102 may be provided to a transmit coil 114 (e.g., a transmit antenna circuit 114) of a transmitter 104 from a power source (not shown) to generate a wireless (e.g., magnetic or electromagnetic) field 105 for performing energy or power transfer. A receive coil 118 (e.g., a receive antenna circuit 118) of a receiver 108 may couple to the wireless field 105 and may generate an output power 110 for storing or consumption by a device (not shown) coupled to the output power 110. Both the transmitter 104 and the receiver 108 may be separated by a distance 112.

In one implementation, the transmit coil 114 and the receive coil 118 are configured according to a mutual resonant relationship. When the resonant frequency of the receive coil 118 and the resonant frequency of the transmit coil 114 are substantially the same, or very close, transmission losses between the transmitter 104 and the receiver 108 are minimal. As such, wireless power transfer may be provided over a larger distance in contrast to purely inductive solutions that may require large coils placed very close to one another (e.g., sometimes within millimeters). Resonant inductive coupling techniques may thus allow for improved efficiency and power transfer over various distances and with a variety of inductive coil configurations.

The receiver 108 may receive power when the receive coil 118 is located in the wireless field 105 produced by the transmit coil 114. The wireless field 105 corresponds to a region where energy output by the transmit coil 114 may be captured by the receive coil 118. The wireless field 105 may correspond to the "near-field" of the transmitter 104. The "near-field" may correspond to a region in which there are strong reactive fields resulting from the currents and charges in the transmit coil 114 that minimally radiate power away from the transmit coil 114, rather than radiating electromagnetic energy away into free space. The "near-field" may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit coil 114 and the receive coil 118 where this coupling may occur is referred to herein as a coupling-mode region.

Figure 2:
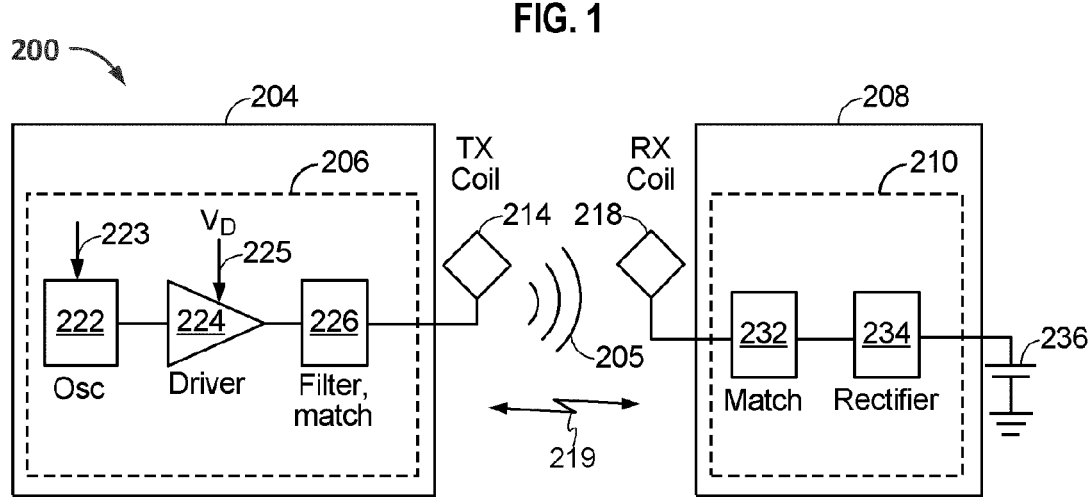
FIG. 2 is a functional block diagram of a wireless power transfer system, in accordance with another implementation.

FIG. 2 is a functional block diagram of a wireless power transfer system 200, in accordance with another implementation. The system 200 includes a transmitter 204 and a receiver 208. The transmitter 204 may include a transmit circuit 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coil 214 at, for example, a resonant frequency of the transmit coil 214 based on an input voltage signal ($V_D$) 225. The filter and matching circuit 226 may filter out harmonics or other unwanted frequencies and may also match the impedance of the transmitter 204 to the impedance of the transmit coil 214 for maximal power transfer. The driver circuit 224 may drive a current through the transmit coil 214 to generate a wireless field 205 for wirelessly outputting power at a level sufficient for charging a battery 236 of an electric vehicle, for example.

The receiver 208 may include a receive circuit 210 that may include a matching circuit 232 and a rectifier circuit 234. The matching circuit 232 may match the impedance of the receive circuit 210 to the receive coil 218. The rectifier circuit 234 may generate a direct current (DC) power output from an alternating current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via band signaling using characteristics of the wireless field 205. The receiver 208 may be configured to determine whether an amount of power transmitted by the transmitter 204 and received by the receiver 208 is appropriate for charging the battery 236.

Figure 3:
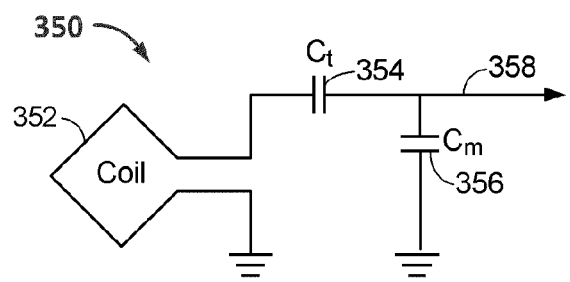
FIG. 3 is a schematic diagram of a portion of the transmit circuit or the receive circuit of FIG. 2 including a transmit coil or a receive coil, in accordance with some implementations.

FIG. 3 is a schematic diagram of a portion of the transmit circuit 206 or the receive circuit 210 of FIG. 2 including a transmit coil or a receive coil, in accordance with some implementations. As illustrated in FIG. 3, a transmit or receive circuit 350 may include a coil 352. The coil 352 may also be referred to as a "loop" antenna, a "magnetic" coil or an induction coil 352. The term "coil" generally refers to a component that may wirelessly output or receive energy for coupling to another "coil." As used herein, the coil 352 is an example of a "power transfer component" of a type that is configured to wirelessly output and/or receive power. The coil 352 may include an air core or a physical core such as a ferrite core (not shown).

The resonant frequency of a coil is based on the inductance and capacitance of the coil. Inductance may be simply the inductance created by the coil 352, whereas, capacitance may be added to the coil's inductance to create a resonant structure at a desired resonant frequency. As a non-limiting example, a capacitor 354 and a capacitor 356 may be added to the transmit or receive circuit 350 to create a resonant circuit that selects a signal 358 at a resonant frequency. Accordingly, for larger diameter coils, the size of capacitance needed to sustain resonance may decrease as the diameter or inductance of the coil increases.

Furthermore, as the diameter of the coil increases, the efficient energy transfer area of the near-field may also increase. Other resonant circuits formed using other components are also possible. As another non-limiting example, a capacitor may be placed in parallel between the two terminals of the circuit 350. For transmit coils, the signal 358, with a frequency that substantially corresponds to the resonant frequency of the coil 352, may be an input to rather than an output from the coil 352.

Figure 4:
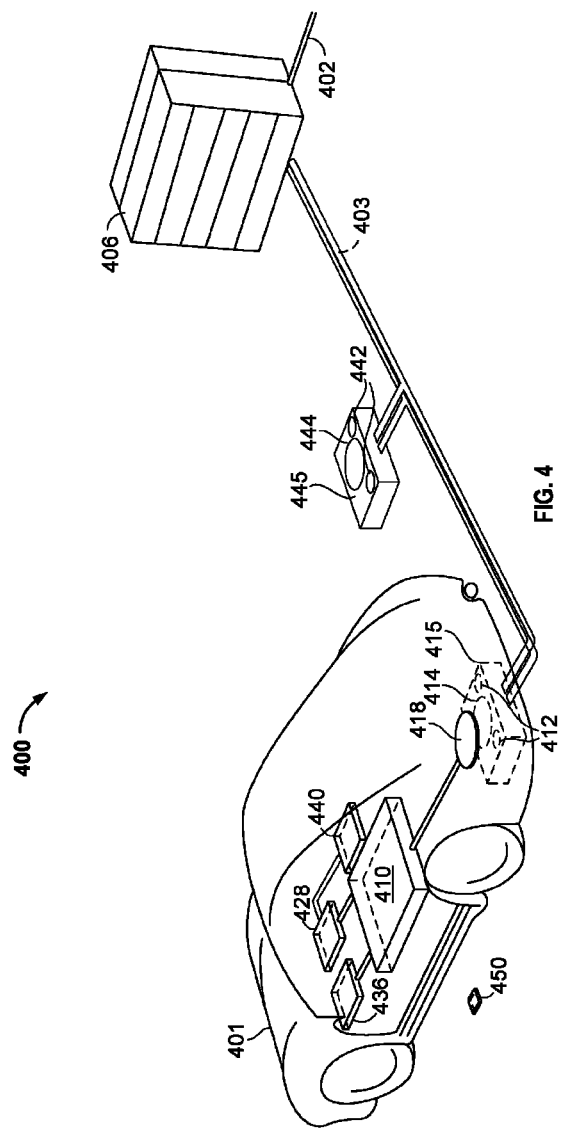
FIG. 4 is a perspective-view diagram of a vehicle aligned over a wireless power transmit unit, in accordance with some implementations.

FIG. 4 is a perspective-view diagram of a vehicle 401 aligned over a wireless power transmit unit (PTU) 415, in accordance with some implementations. A wireless power transfer system 400 may enable charging of the vehicle 401 while the vehicle 401 is aligned over the wireless PTU 415. In some implementations, the wireless power transfer system 400 may comprise a transmit circuit 406 connected to a power backbone 402. The transmit circuit 406 may provide an alternating current (AC) via an electrical connection 403 to one or more wireless PTUs, for example the wireless PTU 415 and an adjacent wireless PTU 445. Although only two PTUs are illustrated, the wireless power transfer system 400 is not so limited and may comprise any number of wireless PTUs. Thus, the wireless power transfer system 400 may provide simultaneous wireless charging for multiple vehicles.

The wireless PTU 415 may comprise a transmit coil 414 configured to receive the AC current from the transmit circuit 406. The wireless PTU 415 may additionally comprise at least one PTU remote keyless entry (RKE) circuit 412 (e.g., two are shown in FIG. 4) including at least one antenna and having functionality for controlling operation of the PTU 415 and the adjacent PTU 445. Likewise, the adjacent wireless PTU 445 may comprise at least one PTU RKE circuit 442 including at least one antenna and a transmit coil 444 configured to receive the AC current from the transmit circuit 406. Where a plurality of PTU RKE circuits 412/442 are utilized, each of the plurality of PTU RKE circuits 412/445 may be disposed in specific locations on or in the respective PTU 415/445 to reduce the impact of a wireless field generated in the PTU 415/445 on the respective antennas of the PTU RKE circuits 412/442. In some implementations, an electronic gain associated with the antennas of the RKE circuits 412 may be increased as compared to similar antennas in the vehicle RKE circuit 440 or an associated RKE key fob 450. For the purposes of this application, any operation performed with or by an RKE key fob may also be performed by a wearable, portable, or handheld device, such as a smart phone, that has been programmed to be compatible with the described systems in addition to, or in lieu of, the RKE key fob. In at least some implementations, the at least one PTU RKE circuits 412/442 may be operational while one or more of the wireless PTUs 415 and 445 are generating a wireless field. Accordingly, it is desirable that the PTU RKE circuits 412/442 include filtering circuitry (not shown) to block frequencies at or near the frequency of operation of the PTUs 415/445 (e.g., 80-90 kHz).

The vehicle 401 may include a receive circuit 410 connected to a receive coil 418. The receive coil 418 may receive power when located in a wireless field produced by the transmit coil 414 of the PTU 415. The vehicle 401 may additionally include a battery 436. The battery 436 may store power received from the receive circuit 410 for later use by the vehicle 401. The vehicle additionally includes a controller circuit 428 connected to at least the receive circuit 410 and a vehicle RKE circuit 440 comprising at least one antenna (not shown). The controller circuit 428 controls the operation of at least the receive circuit 410. The vehicle RKE circuit 440 provides RKE functionality for the vehicle 401, such as unlocking doors and/or other useful features, when the associated RKE key fob 450 having an antenna (not shown) is detected within a certain distance (e.g., 2-4 meters) of the vehicle 401. The vehicle RKE circuit 440 may communicate with the RKE key fob 450 and the at least one PTU RKE circuit 412 via low frequency (LF)/radio frequency (RF) communication links. For example, when the driver grasps a door handle of the vehicle 401 the vehicle RKE circuit 440 may transmit a LF signal (e.g., a 21 kHz, 121 kHz, 125 kHz, or 135 kHz signal). This LF signal may be utilized to initiate detection and authentication of the paired RKE key fob 450. In response, the RKE key fob 450 may transmit an RF or high frequency signal (e.g., a 315 MHz, 433 MHz or 866 MHz signal) including identifying information back to the vehicle RKE circuit 440. If the identifying information matches authentication information stored in or otherwise provided to the vehicle RKE circuit 440, the vehicle RKE circuit 440 may unlock the respective doors or perform the appropriate RKE functionality.

Proper operation of the vehicle RKE circuit 440 and/or the paired RKE key fob 450 may be compromised when either the transmit coil 414 or the transmit coil 444 are generating a wireless field (not shown). For example, the high magnetic fields present in the wireless field may saturate the antenna(s) of the vehicle RKE circuit 440 as well as the antenna of the RKE key fob 450. Such saturation of a ferrite core, for example, of the antenna may be caused by magnetic fields oscillating at any and all frequencies, as each the constructive interference with the magnetic fields from other sources at any frequency may add to the density of magnetic flux induced in the ferrite core, which may lead to undesirable saturation of the core. Accordingly, the vehicle RKE circuit 440 may not detect or authenticate the RKE key fob 450 while either of the transmit coil 414 and the transmit coil 444 are active. Likewise, the RKE key fob 450 may not be able to detect the LF signal transmitted by the vehicle RKE circuit 440 while either of the transmit coil 414 and the transmit coil 444 are active. For this reason, at least one PTU RKE circuit 412 may direct the transmit circuit 406 to shut off the supply of AC power to the transmit coil 414, and in some cases, to the transmit coil 444 upon detection of a novel high frequency periodic frame transmitted by the RKE key fob 450 in response to the RKE key fob 450 determining that its LF antenna is saturated (e.g., by the wireless field generated by either of the transmit coil 414 or the transmit coil 444). Moreover, in some implementations the RKE key fob 450 may be configured to harvest wireless power from the wireless field generated by either of the transmit coil 414 or the transmit coil 444.

Figure 5:
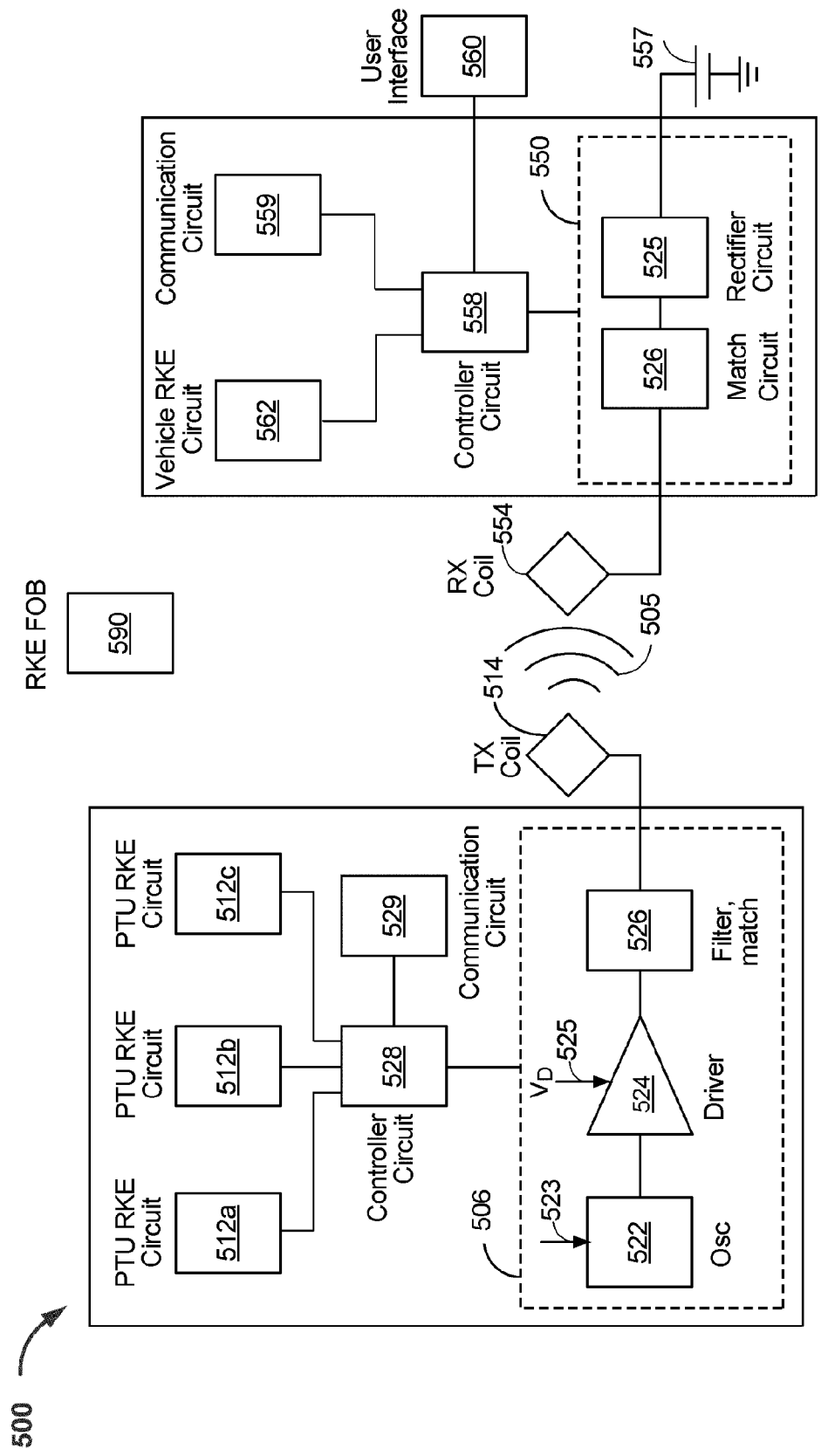
FIG. 5 is a functional block diagram of a wireless power transfer system, in accordance with some implementations.

FIG. 5 is a functional block diagram of a wireless power transfer system 500, in accordance with some implementations. FIG. 5 describes the interaction between a vehicle RKE circuit 562, one or more PTU RKE circuits 512*a*-512*c*, and an RKE key FOB 590 for controlling wireless power transfer. As shown in FIG. 5, the transfer system 500 may comprise a receive coil 554 electrically connected to a receive circuit 550, which may correspond to the receive coils 218/418 and the receive circuits 210/410 of FIGS. 2 and 4, respectively. The receive circuit 510 may include a match circuit 526 electrically connected to a rectifier circuit 525. The receive coil 554 may be electrically connected to the match circuit 526. The rectifier circuit 525 may provide a DC current to a battery 557. Unless stated otherwise, each component within the receive circuit 510 may correspond to and have substantially the same functionality as the respective component within the receive circuit 210, as previously described in connection with FIG. 2. To provide power to the receive circuit 510, energy may be transmitted from a transmit coil 514 to the receive coil 554 through a wireless field 505.

The transfer system 500 may further include a controller circuit 558 electrically connected to each of a communication circuit 559, a user interface 560, the receive circuit 510 and to least one vehicle RKE circuit 562 comprising at least one antenna (not shown). In some implementations, the controller circuit 558 may comprise a vehicle control unit (VCU). The controller circuit 558 and the at least one vehicle RKE circuit 562 may correspond to the controller circuit 428 and the vehicle RKE circuit 440 as previously described in connection with FIG. 4. The controller circuit 558 may control the receive circuit 510 based on input from at least one of the vehicle RKE circuit 562, the communication circuit 559 and the user interface 560. The communication circuit 559 may provide a communications link to a PTU and to the RKE key FOB 590. The user interface 560 may be configured to provide feedback to a driver of the vehicle (e.g., the vehicle 401 as shown in FIG. 4) regarding a level of alignment or distance between the receive coil 554 and the transmit coil 514 of the PTU.

The vehicle RKE circuit 562 may provide keyless entry functionality for the vehicle, as previously described in connection with FIG. 4. For example, the vehicle RKE circuit 562 may transmit a low frequency RKE signal for initiating and/or authenticating an RKE operation. The vehicle RKE circuit 562 may transmit the low frequency RKE signal in response to receiving input from the RKE key fob 590, from one or more PTU RKE circuits 512a-512c or from one or more sensors or antennas on the vehicle (not shown) indicating the initiation of an RKE operation.

In some implementations, the RKE circuit 562 may also transmit the LF RKE signal in response to detecting a wireless signal from a PTU RKE circuit located within an adjacent PTU (e.g., the PTU RKE circuit 442 in PTU 445 of FIG. 4). In yet other implementations, the RKE circuit 562 may transmit the LF RKE signal in response to detecting a wireless signal (e.g., a Bluetooth signal or a WiFi signal) from a personal wearable smart device (e.g., portable RF-enabled multimedia players, smart watches, etc.) In yet other implementations, the vehicle RKE circuit 562 may transmit the LF RKE signal to trigger a reply signal from the RKE key FOB 590. The vehicle RKE circuit 562 as well as the RKE key fob 590 may lose RKE functionality due to saturation of their respective antennas caused by the presence of the wireless field 505. Thus, a PTU may receive the low frequency RKE signal from the receiver or a novel high frequency signal from the RKE key fob 590 (as will be described in connection with FIGS. 6-10) and discontinue the transmission of wireless power from the PTU and/or from at least one adjacent PTU (e.g., the PTU 445 of FIG. 4) in response.

FIG. 5 additionally includes a wireless power transmit unit (PTU). The PTU may comprise a transmit circuit 506 electrically connected to a transmit coil 514, which may correspond to the transmit circuits 206/406 and transmit coils 214/414 of FIGS. 2 and 4, respectively. The transmit circuit 506 may include an oscillator 523 receiving a frequency control signal 523, a driver circuit 524 receiving an input voltage signal ($V_D$) 525 and a filter and matching circuit 526 connected to the transmit coil 514. Unless stated otherwise, each component within the transmit circuit 506 may correspond to, be interconnected as, and have substantially the same functionality as the respective component within the transmit circuit 206, as previously described in connection with FIG. 2.

The transmit circuit 506 may provide an AC current (e.g., a primary current) to the transmit coil 514. The transmit coil 514 produces the wireless field 505 based on the primary current. When substantially aligned with the transmit coil 514, the receive coil 518 may be located substantially within the wireless field 505. When the receive coil 554 is located within the wireless field 505 the wireless field 505 induces an AC current (e.g., a secondary current) in the receive coil 554.

The PTU may further include a controller circuit 528 electrically connected to a communication circuit 529, to the transmit circuit 506 and to each of a plurality of PTU RKE circuits 512a, 512b, and 512c (hereinafter 512a-512c). The communication circuit 529 may be configured to communicate with the communication circuit 559 within the wireless power receiver as well as with the RKE key fob 590. The PTU RKE circuits 512a-512c may correspond to the PTU RKE circuits 412, as previously described in connection with FIG. 4.

The PTU RKE circuits 512a-512c may receive the LF RKE signal transmitted from the vehicle RKE circuit 562, and/or a novel high frequency signal from the RKE key fob 590, as will be described in more detail in connection with FIGS. 6-10. In response to receiving the LF RKE signal or the novel high frequency signal, one or more of the PTU RKE circuits 512a-512c may send a signal to the controller circuit 528 instructing the controller circuit 528 to shut down the transmit circuit 506 or reduce an amount of current supplied by the transmit circuit 506. The transmit circuit 506 may then discontinue providing the primary current to the transmit coil 514 or reduce the primary current to the transmit coil 514, reducing the strength of or completely eliminating the wireless field 505. In some implementations, a wireless field (not shown) generated by one or more active adjacent PTUs (e.g., the PTU 445 of FIG. 4) may also interfere with the operation of (e.g., saturate the antenna(s) within) the vehicle RKE circuit 562. In such cases, the controller circuit 528 may also send one or more control signals to the one or more active adjacent PTUs (e.g., the PTU 445 of FIG. 4) instructing associated transmit circuits (not shown) to shut down, thus eliminating the wireless fields (not shown) generated by the one or more active adjacent PTUs. In this way, operation of the antennas of the PTU RKE circuits 512a-512c and/or the antenna of the RKE key fob 450 (e.g., RKE key FOB 590 in FIG. 5) may not be compromised by the wireless field 505 or a wireless field of an adjacent PTU (e.g., PTU 445 of FIG. 4).

Figure 6:
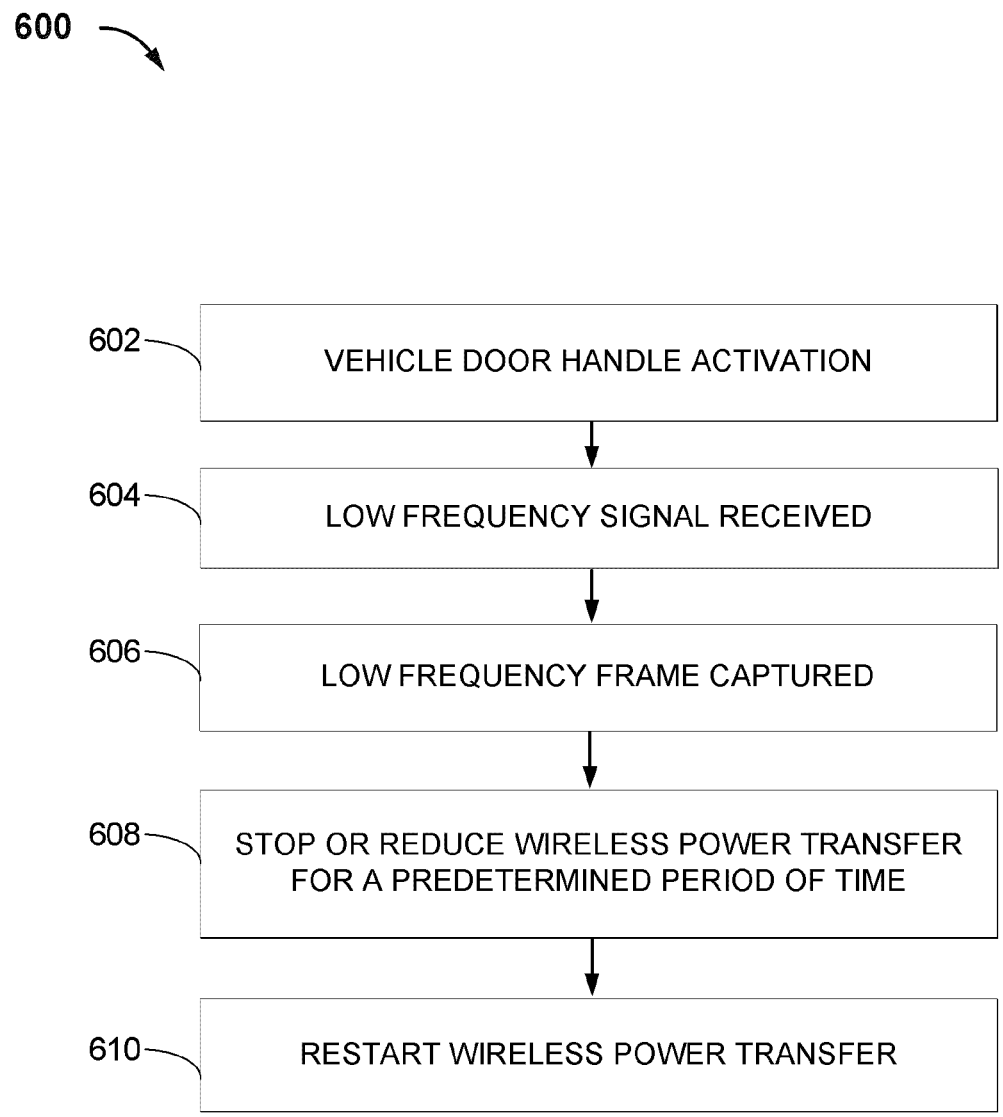
FIG. 6 illustrates a flowchart of a method for wireless communication with a system of a vehicle, in accordance with some implementations.

FIG. 6 illustrates a flowchart 600 of a method for wireless communication with a system of a vehicle, in accordance with some implementations. The method of flowchart 600 is described herein with reference to at least the wireless power transmit unit previously described in connection with FIGS. 4 and 5. In an implementation, one or more of the blocks in flowchart 600 may be performed by a controller such as, for example, the controller circuit 528 in the PTU of FIG. 5. Although the method of flowchart 600 is described herein with reference to a particular order, in various embodiments, blocks herein may be performed in a different order, or omitted, and additional blocks may be added. In some implementations, the flowchart 600 may apply when a vehicle (e.g., the vehicle 401 of FIG. 4) is located in a parking area. In some implementations, the method of flowchart 600 may be utilized when a user of the vehicle 401 touches a surface of the vehicle 401 (e.g., a door or trunk handle) or performs some other motion or gesture recognizable by at least one component of the vehicle RKE system for activating RKE functionality of the vehicle 401. The method may start at block 602, which includes vehicle door handle activation. For example, upon a user touch to one of the vehicle door handles, a circuit (e.g., the vehicle RKE circuit 562 of FIG. 5) may transmit a message to a controller (e.g., the controller circuit 558 of FIG. 5) via a controller area network (e.g., a CAN message). The method may then advance to block 604.

Block 604 includes receiving a low frequency signal. For example, in some implementations, in response to the controller circuit 558 receiving the CAN message, the controller circuit 558 may instruct the communication circuit 559 or the vehicle RKE circuit 562 to transmit the previously-described LF RKE signal utilized for performing RKE functionality. This LF signal may be received by the communication circuit 529 and/or one of the PTU RKE circuits 512a-512c within the wireless PTU of FIG. 5. The method may then advance to block 606.

Block 606 includes capturing a frame of the low frequency signal described in block 604. For example, upon receiving the low frequency signal, the controller circuit 528 and/or the PTU RKE circuits 512a-512c within the wireless PTU of FIG. 5 may process the received signal and determine any indication intended to be conveyed by the received signal. The method may then advance to block 608.

Block 608 includes stopping or reducing the amount of wireless power transferred by the PTU to the vehicle for a predetermined period of time. For example, upon capturing the low frequency signal and determining that an RKE action or process is currently or about to take place, the controller circuit 528 may instruct the transmit circuit 506 to either discontinue or reduce the amount of primary current provided to the transmit coil 514 for a predetermined period of time. In the alternative, the controller circuit 528 may direct the transmit circuit of the adjacent or nearby PTU 445 to completely discontinue or reduce an amount of power supplied to the transmit coil 444 of the PTU for a predetermined period of time. This predetermined period of time may provide a timeout interval after which the transmit circuit 506 (or the transmit circuit in the adjacent PTU) may be directed by the controller circuit 528 to resume, restart or increase the amount of current provided to the transit coil 514 at block 610.

Figure 7:
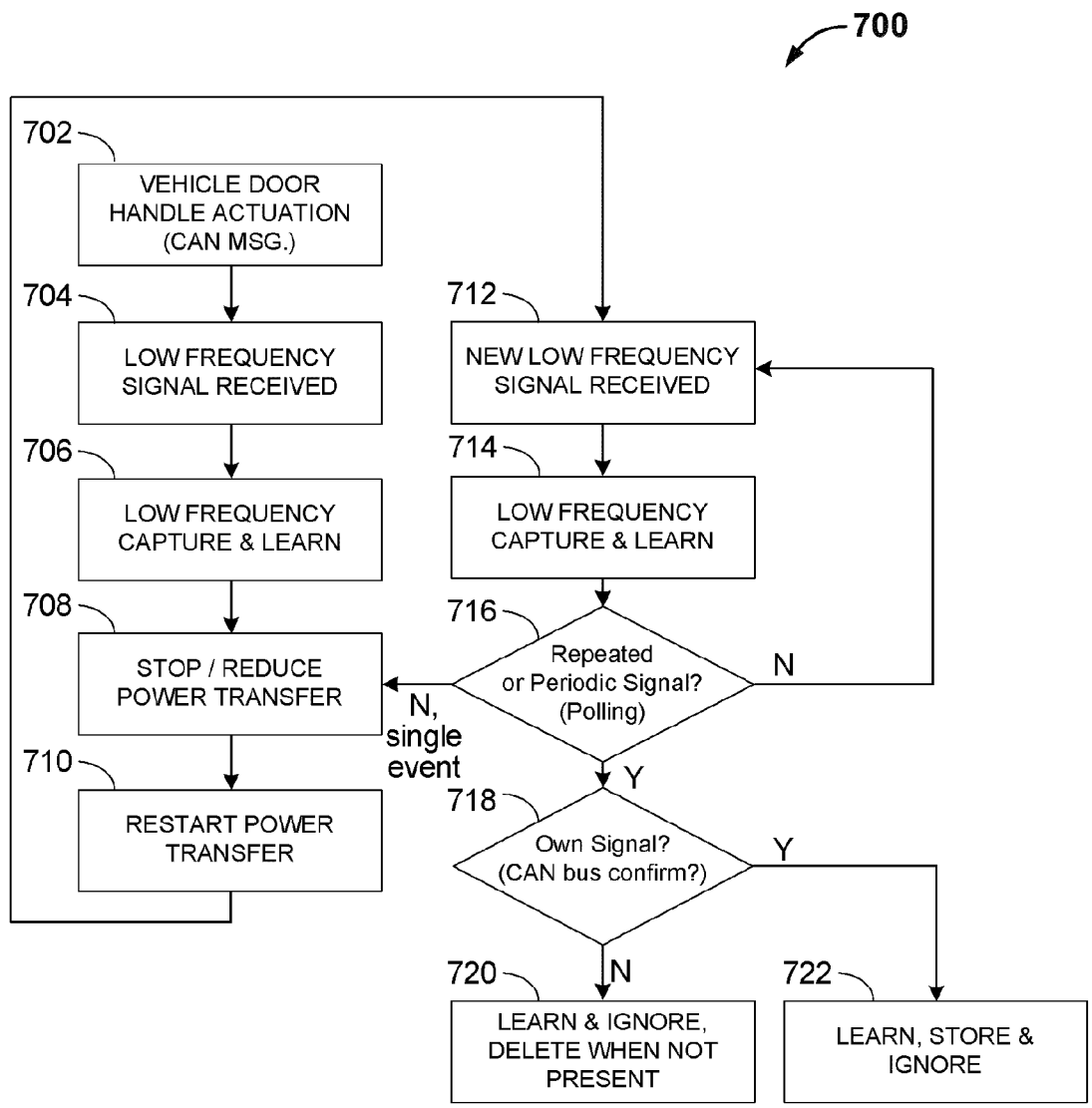
FIG. 7 illustrates a flowchart of a method for wireless communication with a system of a vehicle, in accordance with some implementations.

FIG. 7 illustrates a flowchart 700 of a method for wireless communication with a system of a vehicle, in accordance with some implementations. The method of flowchart 700 is described herein with reference to at least the wireless power transmit unit previously described in connection with FIGS. 4-6. In an implementation, one or more of the blocks in flowchart 700 may be performed by a controller such as, for example, the controller circuit 528 in the PTU of FIG. 5. Although the method of flowchart 700 is described herein with reference to a particular order, in various embodiments, blocks herein may be performed in a different order, or omitted, and additional blocks may be added. In some implementations, the flowchart 700 may apply when a vehicle (e.g., the vehicle 401 of FIG. 4) is located in a parking area. The method may start at block 702. Each of blocks 702, 704, 706, 708 and 710 may correspond to blocks 602, 604, 606, 608 and 610, respectively, as previously described in connection with FIG. 6. Thus, once power transfer is restarted or increased at block 710, the flowchart 700 may advance to block 712.

Block 712 includes receiving a new low frequency signal. For example, another low frequency signal, separate from the low frequency signal received at block 704, may be received by the communication circuit 529 and/or one of the PTU RKE circuits 512a-512c within the wireless PTU of FIG. 5. The method may then advance to block 714.

Block 714 includes capturing and learning the new low frequency signal. For example, the controller circuit 558 and/or RKE circuit 562 may save this new low frequency signal (just as may be performed in block 706). In some implementations, a "fingerprint" of the new low frequency signal may be generated to more easily compare with subsequent or previously received signals. For example, such a "fingerprint" may include indications of one or more of the frequency, length, repetition interval, amplitude and approximate envelope of the new low frequency signal. The method may then advance to block 716.

Block 716 includes determining whether the new low frequency signal, received in block 712, is a repeated or periodic (e.g., polling) signal. This may be determined by comparing the captured version of the signal received in block 704 with the captured version, at block 714, of the signal received in block 712. If the controller circuit 558 and/or RKE circuit 562 determines that the new low frequency signal received in block 712 and captured at block 714 is a repeated or periodic signal, the new low frequency signal may be considered a control signal from another vehicle system, for example, the tire pressure management system (TPMS). Such a repeated or periodic control signal may be received again in the future and thus, may be saved by the controller circuit 528 and/or the RKE circuits 512a-512c for future recognition. If the controller circuit 528 and/or the RKE circuits 512a-512c determine that the new low frequency signal is not a repeated or periodic signal, the flowchart 700 may alternatively advance back to block 712 when another new low frequency signal is received and the above repeated signal determination may be performed again. If the controller circuit 528 and/or the RKE circuits 512a-512c determine that the new low frequency signal is not a repeated or periodic signal but instead a low frequency signal for a single event, such as a request to unlock a door via the RKE system, the flowchart 700 may advance back to block 708 where the power transfer is reduced or stopped for the predetermined period of time.

Block 718 includes determining whether the repeated or periodic low frequency signal is a signal from the same vehicle's system. In some implementations, this determination may be made if a corresponding signal (e.g., a CAN message) was transmitted on the CAN, as previously described. If the determination at block 718 is no, the repeated or periodic signal may not be a control signal from the same vehicle's systems and the flowchart 700 may advance to block 720, where the repeated or periodic low frequency signal may be learned and ignored by the controller circuit 558 and/or vehicle RKE circuit 562 upon a future reception. Since this signal would be determined to be a periodic signal from another system outside the target vehicle, this signal may be deleted from memory when not present for a predetermined period of time after the learn and ignore step of block 720. Contrarily, if the repeated or periodic low frequency signal is a signal from the target vehicle's systems, the flowchart 700 may advance from block 718 to block 722, where the repeated or periodic low frequency signal is learned, stored and ignored upon a future reception of the same repeated or periodic low frequency signal (e.g., an immobilizer signal or a TMPS signal).

Figure 8:
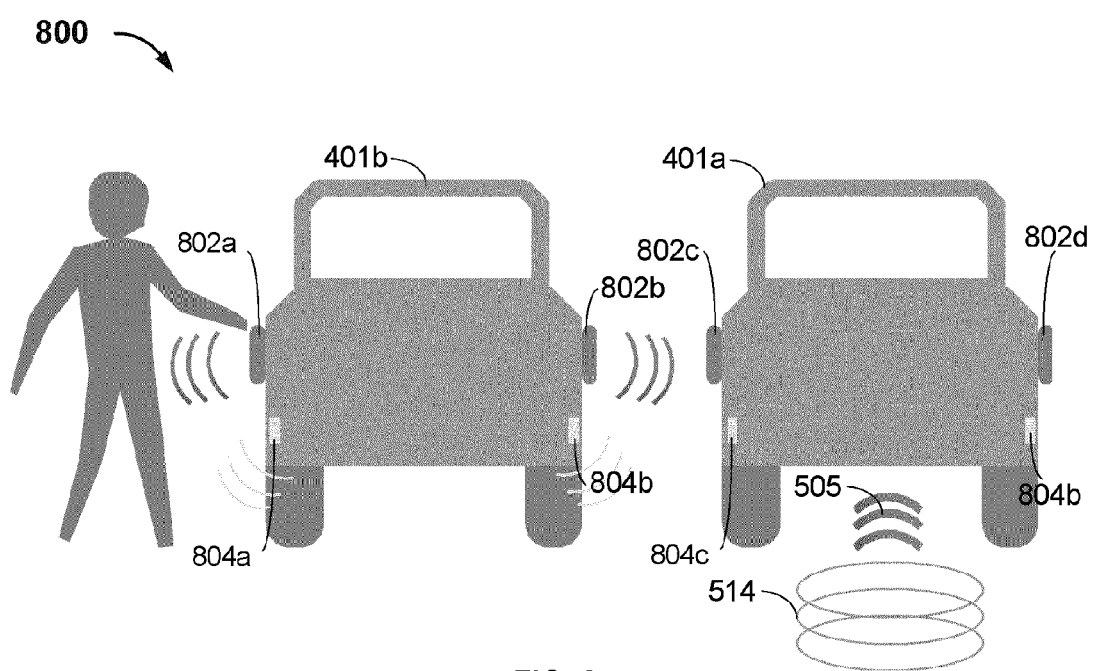
FIG. 8 illustrates the locations of a plurality of antennas for use in transmitting and receiving at least the low frequency signals previously discussed in connection with FIGS. 4-7, in accordance with some implementations.

FIG. 8 illustrates the locations of a plurality of antennas for use in transmitting and receiving at least the low frequency signals previously discussed in connection with FIGS. 4-7, in accordance with some implementations. As shown in FIG. 8, a first vehicle 401a and a second vehicle 401b, which each correspond to the vehicle 401 of FIG. 4, may be parked adjacent to one another. As show, the first vehicle 401a may receive wireless power from the transmit coil 514 via the wireless field 505, as previously described in connection with FIGS. 4 and 5. In some implementations, the antenna previously described to transmit and/or receive the low frequency signals may be the antennas 802a, 802b, 802c, 802d that are located in, on or near the door handles for the RKE system, and/or the antennas 804a, 804b, 804c, 804d originally utilized for the TPMS system. Thus, in at least some implementations, antennas originally utilized for other vehicle systems may be reused for transmission and/or reception of the low frequency signals previously described in connection with FIGS. 4-7.

Figure 9:
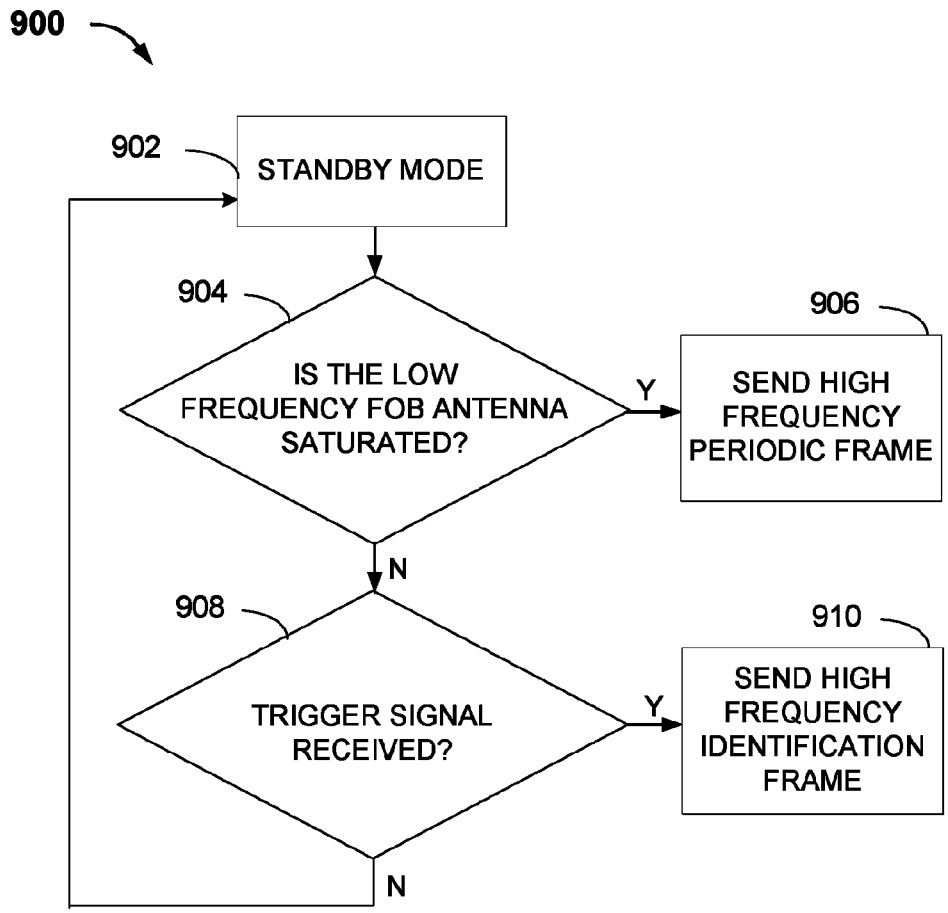
FIG. 9 shows a flowchart that may be utilized by the RKE key fob of FIG. 4 or 5.

FIG. 9 shows a flowchart 900 that may be utilized by the RKE key fob 450 of FIG. 4 or 590 of FIG. 5. Flowchart 900 may additionally be utilized by other wirelessly communicating vehicle systems, such as TMPS systems, or by a portable, handheld, or wearable device configured to perform at least the functions of the RKE key fob 450, such as a smart phone. The flowchart 900 may begin in standby mode at block 902. The flowchart 900 then advances to block 904 where a determination is made as to whether the low frequency antenna of the RKE key fob 450 or 509 (or of another system such as the TMPS system) is saturated by an external magnetic field. In some implementations, the magnetic field may be the wireless field 505 utilized for wireless power transfer. If the determination is yes, the flowchart 900 advances to block 906. If the determination is no, the flowchart alternatively advances to block 908.

At block 906, the RKE key fob 450/590 transmits a high frequency periodic frame indicating that its LF antenna is saturated. This signal is differentiated from conventional high frequency RKE signals previously described in that it does not necessarily identify the RKE key fob 450/590 or indicate activation of one or more RKE functions, but merely provides an indication to the RKE circuit 412 within the vehicle 401 of FIG. 4, for example, that the LF antenna of the RKE key fob 450/590 is saturated and will likely be unable to receive and decode any LF signals from the RKE system of the vehicle 401 in its present condition.

At block 908, the RKE key fob 450/590 may make a determination as to whether a trigger signal is received from the RKE system of the vehicle 401. If the determination is no, the flowchart 900 may loop back to block 902 and remain in or transition to the standby mode. If the determination is yes, the flowchart 900 may advance to block 910, where the RKE key fob 450/590 may be configured to send a high frequency identification frame to the RKE system of the vehicle 401. This high frequency identification frame may be the same as the RF signal (e.g., a 315 MHz, 133 MHz or 966 MHz signal) including identifying information previously described in connection with FIG. 4. Such a high frequency identification frame may be differentiable from the high frequency periodic frame of block 906 in that it does not necessarily indicate that the LF antenna of the RKE key fob 450/590 is saturated, but merely includes indication of information identifying the RKE key fob 450/590 that is decodable by the vehicle RKE system.

FIG. 10 is a graphic diagram illustrating the high frequency periodic signal of block 906, in accordance with some implementations. As shown in FIG. 10, the graphic diagram depicts time on the horizontal axis and amplitude of the high frequency signal 1000 on the vertical axis. The high frequency signal 1000 may comprise a plurality of frames or pulses 1002. Each of the plurality of frames or pulses 1002 has a predetermined duration 1004 and may repeat with a repeat interval 1006. For example, in some implementations, there may be six frames or pulses 1002, each being transmitted at a predetermined carrier frequency. Accordingly, all six frames or pulses 1002 may be transmitted by the RKE key fob 450/590 or by another system, such as the TPMS system, in response to a determination that an external magnetic field has saturated the LF receive antenna. The high frequency signal 1000 may have any carrier frequency, number of frames or pulses 1002, duration 1004, repeat interval 1006, and/or coding protocol sufficient to uniquely indicate the LF receive antenna saturation to a similarly enabled receiving device.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the applications have been described herein. It is to be understood that not necessarily all such advantages may be achieved in accordance with any particular implementation of the application. Thus, concepts may be implemented or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for wireless communication with a system of a vehicle, the apparatus comprising:
   a first antenna configured to receive a signal from the system of the vehicle; and
   a processor configured to:
      determine whether the first antenna is saturated by an external magnetic field, and
      cause at least one of the first antenna or a second antenna to transmit a frame indicating that the first antenna is saturated by the external magnetic field in response to determining that the first antenna is saturated.

2. The apparatus of claim 1, wherein the frame is a periodic frame.

3. The apparatus of claim 1, wherein the processor is further configured to transmit an identification frame identifying the apparatus in response to receiving a trigger signal.

4. The apparatus of claim 3, wherein the frame indicating that the first antenna is saturated has a different pattern compared to the identification frame.

5. The apparatus of claim 1, wherein a wireless power transmitter is configured to reduce or discontinue wireless power transmission in response to receiving the frame.

6. The apparatus of claim 1, wherein the frame is transmitted at a frequency higher than a frequency of the external magnetic field.

7. The apparatus of claim 1, further comprising a battery, wherein at least one of the first antenna and the second antenna is configured to receive wireless power from the external magnetic field sufficient to charge the battery.

8. The apparatus of claim 1, wherein the apparatus comprises one of a remote keyless entry fob, a handheld device configured to communicate with a remote keyless entry system, and a tire pressure management system.

9. A method for wireless communication with a system of a vehicle, the method comprising:
   determining whether a first antenna is saturated by an external magnetic field, and
   transmitting a frame indicating that the first antenna is saturated by the external magnetic field in response to determining that the first antenna is saturated.

10. The method of claim 9, wherein the frame is a periodic frame.

11. The method of claim 9, further comprising transmitting an identification frame in response to receiving a trigger signal.

12. The method of claim 11, wherein the frame indicating that the first antenna is saturated has a different pattern compared to the identification frame.

13. The method of claim 9, wherein a wireless power transmitter is configured to reduce or discontinue wireless power transmission in response to receiving the frame.

14. The method of claim 9, wherein the frame is transmitted at a frequency higher than a frequency of the external magnetic field.

15. The method of claim 9, further comprising receiving, via at least one of the first antenna and a second antenna, wireless power sufficient to charge a battery from the external magnetic field.

16. A non-transitory, computer-readable medium comprising code that, when executed, causes an apparatus for wireless communication with a system of a vehicle to:
   determine whether a first antenna of the apparatus is saturated by an external magnetic field, and
   transmit a frame indicating that the first antenna is saturated by the external magnetic field in response to determining that the first antenna is saturated.

17. The medium of claim 16, wherein the frame is a periodic frame.

18. The medium of claim 16, wherein the code, when executed, further causes the apparatus to transmit an identification frame in response to receiving a trigger signal.

19. The medium of claim 18, wherein the frame indicating that the first antenna is saturated has a different pattern compared to the identification frame.

20. The medium of claim 16, wherein a wireless power transmitter is configured to reduce or discontinue wireless power transmission in response to receiving the frame.

21. The medium of claim 16, wherein the frame is transmitted at a frequency higher than a frequency of the external magnetic field.

22. The medium of claim 16, wherein the code, when executed, further causes the apparatus to receive, via at least one of the first antenna and a second antenna, wireless power sufficient to charge a battery of the apparatus from the external magnetic field.

23. The medium of claim 16, wherein the apparatus comprises one of a remote keyless entry fob, a handheld device configured to communicate with a remote keyless entry system, and a tire pressure management system.

24. An apparatus for wireless communication with a system of a vehicle, the apparatus comprising:
   means for receiving a signal from the system of the vehicle;
   means for determining whether the means for receiving the signal is saturated by an external magnetic field, and
   means for transmitting a frame indicating that the means for receiving the signal is saturated by the external magnetic field in response to determining that the means for receiving the signal is saturated.

25. The apparatus of claim 24, wherein the frame is a periodic frame.

26. The apparatus of claim 24, further comprising means for transmitting an identification frame identifying the apparatus in response to receiving a trigger signal.

27. The apparatus of claim 26, wherein the frame indicating that the means for receiving the signal is saturated has a different pattern compared to the identification frame.

28. The apparatus of claim 24, wherein a wireless power transmitter is configured to reduce or discontinue wireless power transmission in response to receiving the frame.

29. The apparatus of claim 24, wherein the frame is transmitted at a frequency higher than a frequency of the external magnetic field.

30. The apparatus of claim 24, further comprising means for storing electrical energy, wherein at least one of the means for receiving the signal and the means for transmitting the frame is configured to receive wireless power from the external magnetic field sufficient to charge the means for storing electrical energy.

* * * * *